United States Patent
Jog et al.

(10) Patent No.: US 11,008,491 B2
(45) Date of Patent: May 18, 2021

(54) MULTISTAGE COPOLYMER COMPOSITIONS FOR USE IN ELASTOMERIC CONSTRUCTION CAULKS AND SEALANTS

(71) Applicants: Dow Global Technologies LLC, Midland, MI (US); Rohm and Haas Company, Collegeville, PA (US)

(72) Inventors: Prasanna K. Jog, Lansdale, PA (US); Audrey B. Liss, Newtown, PA (US); Mark D. Westmeyer, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 501 days.

(21) Appl. No.: 15/751,660

(22) PCT Filed: Sep. 28, 2016

(86) PCT No.: PCT/US2016/054075
§ 371 (c)(1),
(2) Date: Feb. 9, 2018

(87) PCT Pub. No.: WO2017/058849
PCT Pub. Date: Apr. 6, 2017

(65) Prior Publication Data

US 2018/0230348 A1  Aug. 16, 2018

Related U.S. Application Data

(60) Provisional application No. 62/234,908, filed on Sep. 30, 2015.

(51) Int. Cl.
| | |
|---|---|
| *C08K 3/22* | (2006.01) |
| *C08K 3/36* | (2006.01) |
| *C08L 33/10* | (2006.01) |
| *C09K 3/10* | (2006.01) |
| *C08F 220/18* | (2006.01) |
| *C08K 3/013* | (2018.01) |

(52) U.S. Cl.
CPC .......... *C09K 3/1006* (2013.01); *C08F 220/18* (2013.01); *C08K 3/013* (2018.01); *C08K 3/22* (2013.01); *C08K 3/36* (2013.01); *C08L 33/10* (2013.01); *C08F 2500/02* (2013.01); *C08K 2003/2241* (2013.01); *C08L 2201/52* (2013.01)

(58) Field of Classification Search
CPC .. C08F 2/001; C08F 2/22; C08F 16/02; C08F 22/00; C08F 22/02; C08F 220/18; C08F 261/00; C08F 265/02; C08F 2500/02; C08F 265/00; C08K 3/013; C08K 3/22; C08K 3/36; C08K 2003/2241; C08L 33/10; C08L 2201/52
See application file for complete search history.

(56) References Cited

U.S. PATENT DOCUMENTS

| | | | |
|---|---|---|---|
| 4,325,856 A | 4/1982 | Ishikawa et al. | |
| 4,654,397 A | 3/1987 | Mueller-Mall et al. | |
| 4,814,373 A | 3/1989 | Frankel et al. | |
| 5,308,890 A * | 5/1994 | Snyder | C09D 151/003 523/201 |
| 8,193,278 B2 | 6/2012 | Demarest et al. | |
| 2011/0034621 A1 | 2/2011 | Demarest et al. | |

FOREIGN PATENT DOCUMENTS

| | | |
|---|---|---|
| WO | 2013119523 | 8/2013 |
| WO | 2013119524 | 8/2013 |
| WO | 2014099575 | 6/2014 |

\* cited by examiner

*Primary Examiner* — Irina S Zemel
*Assistant Examiner* — Jeffrey S Lenihan

(57) ABSTRACT

The present invention provides low tack, low temperature flexible aqueous caulk or sealant compositions comprising multistage aqueous emulsion copolymers having a hard stage and a soft stage, the soft stage including, in copolymerized form, one or more nonionic monomers and (i) methacrylic acid (MAA) or a salt thereof and a second acid monomer having a lower pKa than methacrylic acid or a salt thereof, or (ii) a copolymer having a mixture of acid or salt groups and hydroxyl groups, the acid groups chosen from, in copolymerized form, MAA and the second acid monomer, or salts thereof; and the hard stage having a weight average molecular weight (Mw) by gel permeation chromatography (GPC) against polystyrene standards of from 20,000 to 70,000.

10 Claims, No Drawings

MULTISTAGE COPOLYMER COMPOSITIONS FOR USE IN ELASTOMERIC CONSTRUCTION CAULKS AND SEALANTS

The present invention relates to filled and unfilled aqueous caulk and sealant compositions, preferably, that are substantially free of any plasticizer, comprising multistage copolymers having a hard stage and a soft stage, wherein the soft stage comprises a mixture of carboxylic acids or a combination of acid and hydroxyl groups, to the methods of making the multistage copolymers, and to the methods of using them to make caulks and sealants. More specifically, it relates to filled and unfilled aqueous caulk and sealant compositions which comprise one or more multistage aqueous emulsion copolymers having a hard stage and a soft stage, such as a hard core and soft shell copolymer, the soft stage including, in copolymerized form, any of (i) methacrylic acid (MAA) and a second acid monomer having a lower pKa than methacrylic acid, or (ii) a copolymer having a mixture of acid groups and hydroxyl groups, the acid groups chosen from, in copolymerized form, MAA and the second acid monomer; and, the hard stage including, in copolymerized form, from 0.1 to 3 wt. % of acrylic acid, based on the total weight of monomers used to make the hard stage, wherein, the hard stage comprises from 10 to 30 wt. % of the multistage copolymer, based on the total weight of monomers used to make the multistage copolymer. Caulks and sealants comprising the inventive filled or unfilled compositions provide flexibility in a low tensile modulus at very low use temperatures.

Known aqueous acrylic caulks and sealants show a very significant increase in tensile modulus as temperature is lowered towards −30 deg C. (which is relevant as the lower end of typical ambient service temperature).

As recently disclosed in U.S. Pat. No. 8,193,278B2, to Demarest et al., caulks and sealants that provide good wet aged adhesion to substrates at low temperatures have been formulated without plasticizers. Plasticizers are expensive to use and tend to volatilize in use or migrate to the surface of the formulated sealant; this compromises mechanical properties, and leads to glossing, dirt pick up, mildew formation and discoloration of coatings applied over the caulks and sealants. To prevent problems with tackiness in such caulks and sealants, one has to increase the amount of fillers used, which increases low temperature tensile modulus, increases stress and reduces elongation of the sealant thereby impairing low temperature performance. There remains a need to improve the low temperature performance of plasticizer free caulks and sealants.

The present inventors have endeavored to solve the problem of providing plasticizer free or substantially plasticizer free caulks and sealants that have a less temperature sensitive tensile modulus, especially at use temperatures below −10° C.

STATEMENT OF THE INVENTION

1. According to the present invention, aqueous caulk and sealant compositions comprise:

one or more multistage aqueous emulsion copolymers having a hard stage and a soft stage, preferably, wherein the hard stage is polymerized before the soft stage, the soft stage including, in copolymerized form, one or more nonionic monomers and any of (i) methacrylic acid (MAA) and a second acid monomer having a lower pKa than methacrylic acid, or (ii) a copolymer having a mixture of acid or salt groups and hydroxyl groups, the acid groups being chosen from, in copolymerized form, MAA, the second acid monomer, and salts thereof; and the hard stage having a weight average molecular weight (Mw) by gel permeation chromatography (GPC) against polystyrene standards of from 20,000 to 70,000, and including, in copolymerized form, one or more nonionic monomers, from 0.9 to 2.5 wt. %, based on the total weight, based on the total weight of monomers used to make the hard stage, of one or more chain transfer agents, and from 0.1 to 3 wt. % of acrylic acid or a salt thereof, based on the total weight of monomers used to make the hard stage, wherein, the hard stage comprises from 10 to 30 wt. %, or, preferably, from 12 to 20 wt. %, of the multistage copolymer, based on the total weight of monomers used to make the multistage copolymer, and, further wherein, the multistage copolymer has a solids content of from 50 to 75 wt. %, or from 60 to 75 wt. %, or, preferably 60 to 70 wt. %.

one or more fillers, extenders, pigments, and/or thickeners, including rheology modifiers, wherein the resulting caulk and sealant compositions have a Brookfield viscosity (room temperature, 5 rpm, using the indicated spindle) of from 3,000 to 1,000,000 cPs, preferably, 10,000 cPs or more or, preferably, 500,000 cPs or less.

2. In accordance with the present invention, the aqueous caulk and sealant compositions as in item 1, above, comprise one or more multistage aqueous emulsion copolymers wherein the hard stage comprises, in copolymerized form, a first monomer mixture of from 0.1 to 3 wt. % acrylic acid or its salts, from 70 to 99.9 wt. %, or, preferably, from 80 to 99.9 wt. % of nonionic monomers B) chosen from butyl methacrylate (BMA), methyl methacrylate (MMA), styrene, t-butyl acrylate (t-BA), α-methyl styrene, vinyl acetate, hexyl acrylate and isobornyl (meth)acrylate, and the remainder of one or more other nonionic monomers, all monomer amounts based on the total weight of monomers used to make the hard stage; and, wherein the soft stage comprises, in copolymerized form, a second monomer mixture of from 92.5 to 99.9 wt. % of one or more nonionic monomers so that from 70 to 99.9 wt. %, or, preferably, from 80 to 99.9 wt. %, or, more preferably, from 90 to 99.9 wt. % of all monomers in the soft stage, in copolymerized form, are nonionic monomers A) chosen from ethyl acrylate (EA), butyl acrylate (BA), 2-ethylhexyl acrylate (2-EHA), lauryl acrylate, lauryl methacrylate, cetyl (meth)acrylate, eicosyl (meth)acrylate, cetyleicosyl (meth)acrylate, behenyl (meth) acrylate, methyl acrylate, butyl methacrylate (BMA), dodecyl methacrylate and octadecyl methacrylate, all monomer amounts based on the total weight of monomers used to make the soft stage, and the remainder of the nonionic monomers in the soft stage, in copolymerized form, are other nonionic monomers.

3. In accordance with the present invention, the aqueous caulk and sealant compositions as in any one of items 1 or 2, above, wherein the hard stage of the one or more multistage aqueous emulsion copolymers is free of carboxyl groups, salts thereof or hydroxyl groups other than carboxyl or salt groups from acrylic acid, in copolymerized form.

4. In accordance with of the present invention, the aqueous caulk and sealant compositions as in any one of items 1, 2, or 3, above, wherein the soft stage of the one or more multistage aqueous emulsion copolymers comprises, in copolymerized form, any of (i) methacrylic acid (MAA) or a salt thereof and a second acid monomer having a lower pKa than methacrylic acid and chosen from a monocarboxylic acid, dicarboxylic acid, phosphorus acid, sulfur acid, any salt thereof, and mixtures thereof, the MAA and the second acid monomer being copolymerized in the total amount of from 0.1 to 5.0 wt. %, based on the total weight of monomers used to make the soft stage; or (ii) a mixture of acid or salt and hydroxyl groups copolymerized from 0.5 to 7.5 wt. %, based on the total weight of monomers used to make the soft stage, of the one or more hydroxyl group containing monomer and from 1.0 to 5.0 wt. %, based on the total weight of monomers used to make the soft stage, of one or more acid monomer chosen from MAA, the second acid monomer, or a salt thereof.

5. In accordance with of the present invention, the aqueous caulk and sealant compositions as in any one of items 1, 2, 3, or 4, above, wherein the hard stage of the one or more multistage aqueous emulsion copolymers has a measured $T_g$ of from 20° C. to 120° C., or, preferably from 50° C. to 100° C., or, more preferably, at least 60° C. and the soft stage has a measured $T_g$ of from −20° C. to −60° C., or, preferably, from −30° C. to −60° C., or, more preferably, −40° C. or lower. In the present invention, a "soft stage" and a "hard stage" will have the $T_g$ as set forth in this item 5.

6. In accordance with the present invention, the aqueous caulk and sealant compositions as in any of items 1, 2, 3, 4, or 5, above, have a pigment to binder ratio of from 0.0:1 to 1:1, or from 0.01:1 to 0.6:1, or, preferably, from 0.01:1 to 0.1:1.

7. In accordance with the present invention, the aqueous caulk and sealant compositions as in item 6, above, comprise one or more pigment, extender or filler chosen from fumed silica, zinc oxide, $TiO_2$, calcium carbonate, zinc ammonium carbonates, barium sulfate, magnesium oxide, aluminum trihydroxide (ATH) and mixtures thereof.

8. In accordance with the present invention, the aqueous caulk and sealant compositions as in any of items 1, 2, 3, 4, 5, 6, or 7, above, comprise from 0.1 to 5 wt. % as solids, based on the total weight of the composition, preferably, 0.5 wt. % or more, or, preferably, 3 wt. % or less, of one or more thickeners.

9. In accordance with the present invention, the aqueous caulk and sealant compositions as in item 8, above, comprise one or more thickener chosen from cellulosics, kaolin, polyacrylic acid salts, hydrophobic alkali swellable emulsion polymers, polyurethane thickeners, and mixtures thereof.

10. In accordance with the present invention, the aqueous caulk and sealant compositions of as in any one of items 1, 2, 3, 4, 5, 6, 7, 8, or 9, above, have a solids content ranging from 50 to 90 wt. %, or from, 55 to 90 wt. %, or, preferably, from 65 to 85 wt. %.

11. In accordance with the present invention, the aqueous caulk and sealant compositions as in any of items 1, 2, 3, 4, 5, 6, 7, 8, 9, or 10, above, are substantially free of plasticizer and, preferably, comprise 0.8 wt. % or less of plasticizer, as solids, based on the total weight of the composition.

12. In accordance with the present invention, the aqueous caulks and sealants as in any previous item comprise a multistage aqueous emulsion copolymer wherein the hard stage of the one or more multistage aqueous emulsion copolymers comprises a mercaptan or thiol residue, preferably, in the amount of from 0.9 to 2.5 wt. %, or up to 2.0 wt. %, as solids of mercaptan or thiol compound based on the total weight of monomers used to make the hard stage.

12. In another aspect of the present invention, methods for making caulk and sealant compositions of one or more multistage aqueous emulsion copolymer comprise:

forming multistage aqueous emulsion copolymers by:
polymerizing a first monomer mixture of from 0.1 to 3 wt. % acrylic acid or its salts, from 70 to 99.9 wt. %, or, preferably, from 80 to 99.9 wt. % of nonionic monomers B) chosen from butyl methacrylate (BMA), methyl methacrylate (MMA), styrene, t-butyl acrylate (t-BA), α-methyl styrene, vinyl acetate, hexyl acrylate and isobornyl (meth) acrylate, and the remainder of one or more other nonionic monomers, such as nonionic monomers A), all monomer amounts based on the total weight of monomers in the first monomer mixture, the first monomer mixture further comprising from 0.9 to 2.5 wt. %, based on the total weight of first monomer mixture, of one or more chain transfer agent to form a hard stage, and, then polymerizing a second monomer mixture comprising, based on the total weight of monomers in the second monomer mixture:

(i) from 0.1 to 5.0 wt. %, in total, of methacrylic acid (MAA) or its salt and a second acid monomer having a lower pKa than methacrylic acid and chosen from a monocarboxylic acid, dicarboxylic acid, phosphorus acid, sulfur acid, any salt thereof, and mixtures thereof, the MAA and the second acid monomer being copolymerized in the amount of from or (ii) from 0.5 to 7.5 wt. % of one or more hydroxyl group containing monomer and from 1.0 to 5.0 wt. % of one or more acid monomer chosen from MAA or its salt and the second acid monomer or a salt thereof, and from 92.5 to 99.9 wt. % of one or more nonionic monomers, such that the second monomer mixture includes from 70 to 99.9 wt. %, or, preferably, from 80 to 99.9 wt. %, or, more preferably, from 90 to 99.9 wt. % are nonionic monomers A) chosen from ethyl acrylate (EA), butyl acrylate (BA), 2-ethylhexyl acrylate (2-EHA), lauryl acrylate, lauryl methacrylate, cetyl (meth)acrylate, eicosyl (meth) acrylate, cetyleicosyl (meth)acrylate, behenyl (meth)acrylate, methyl acrylate, butyl methacrylate (BMA) dodecyl methacrylate and octadecyl methacrylate; and, combining the multistage aqueous emulsion copolymer with one or more pigment, filler, extender and/or thickener to make a composition having a Brookfield viscosity (room temperature, 5 rpm, using the indicated spindle) of from 3,000 to 1,000,000 cPs, preferably, 10,000 cPs or more or, preferably, 500,000 cPs or less.

13. In accordance with the methods of the present invention in item 12, above, wherein the forming of the multistage aqueous emulsion copolymers comprises forming a seed latex prior to polymerizing the first monomer mixture.

14. In accordance with the methods of the present invention in any one of items 12 or 13, above, wherein the forming of the multistage aqueous emulsion copolymers comprises gradual addition feeding each of the first monomer mixture and the second monomer mixture.

15. In yet another aspect of the present invention, methods of use comprise applying the aqueous caulk and sealant compositions of the present invention as in any one of 1 to 11, above, to a substrate chosen from glass, mortar, aluminum, wood, vinyl, fiber cement, brick, concrete block, painted surfaces, combinations thereof, joints therein, seams therein, gaps therein, joints between substrate pieces and gaps between substrate pieces.

16. In yet still another aspect of the present invention, the aqueous caulk and sealant compositions comprise kits comprising the caulk and sealant compositions as in any of 1 to 11, above, such as in a squeeze tube, a cartridge or sausage pack adapted for use with a caulk gun, a pressurized, gunless applicator, or in a pail, adapted for use with a bulk applicator.

All ranges are inclusive and combinable. For example, an amount of acidic monomer ranging up to 5.0 wt. %, based on the total monomer weight, that may range 0.1 wt. % or higher, or, preferably 0.3 wt. % or higher, or, preferably, 3.0 wt. % or less, includes ranges of from 0.1 to 5.0 wt. %, or from 0.1 to 3.0 wt. %, or from 0.1 to 0.3 wt. %, or, preferably, from 0.3 to 3.0 wt. %, or from 0.3 to 5.0 wt. %, or from 3.0 to 5.0 wt. %.

Unless otherwise indicated, any term containing parentheses refers, alternatively, to the whole term as if no parentheses were present and the term without them (i.e. excluding the content of the parentheses), and combinations of each alternative. Thus, the term "(meth)acrylic" refers to any of acrylic, methacrylic, and mixtures thereof.

Unless otherwise specified, all temperature units refer to room temperature (~20-22° C.) and all pressure units refer to standard pressure.

As used herein, the phrase "aqueous" includes water and mixtures comprising 50 wt. % or more of water in a mixture of water with water-miscible solvents that are volatile in use conditions.

As used herein the phrase "ASTM" refers to publications of ASTM International, West Conshohocken, Pa.

As used herein, the term "Brookfield viscosity" refers to the room temperature composition viscosity as measured on a Brookfield RV DV-I viscometer with a Brookfield HELIPATH™ stand using a T-Bar type T-F spindle for compositions with viscosities above 1,000,000 cPs, a T-Bar type T-E spindle for compositions with viscosities of from 3,000 and 1,000,000 cPs. The speed of rotation of the spindle in all cases is 1 rpm and the spindle is run for 10 seconds before the measurement is made. The Brookfield Helipath™ stand allows the spindle to move down into the composition during rotation to ensure proper measurement of highly viscous materials.

As used herein, unless otherwise indicated, the phrase "glass transition temperature" or "measured $T_g$" refers to a DSC method wherein samples were prepared by placing emulsion polymer (20-25 mg of polymer solids) in a pan followed by air drying for 4 hours and then drying the sample at 50° C. for 24 hours. The dry samples were then analyzed using the following conditions: Ramp the temperature to 150° C. at 20° C. per minute followed by a 5 min isothermal hold. The temperature is lowered to −90° C. followed by an isothermal hold for 2 minutes. The temperature is then ramped back to 150° C. at 20° C. per minute. The $T_g$ was measured from the second ramp up. For the inventive polymers, a measured $T_g$ for the hard stage was taken from a dry hard stage alone, without a second or soft stage; and for the soft stage, the measured $T_g$ was that measured for the entire multi-stage polymer As used herein the phrase "pigment to binder ratio" or (P/B) refers to the total weight of fillers, extenders and pigments to the total weight of aqueous binder solids (copolymer).

As used herein the phrase "nonionic monomer" refers to any monomer, the copolymerized monomer residue of which does not bear an ionic charge under conditions of use and over the pH range of pH 2-12.

As used herein, unless otherwise indicated, the phrase "polymer" includes homopolymers, and the phrase "copolymer" refers to any polymers made from two or more different monomers, including terpolymers, block copolymers, segmented copolymers, multi-staged copolymers, graft copolymers, and any mixture or combination thereof.

As used herein, unless otherwise indicated, the term "solids" or "total solids" refers to any material, such as resin, polymer, pigment, additive, which does not volatilize under ambient temperature and standard pressure conditions. Water, volatile solvents or volatile organic compounds and ammonia are not considered solids As used herein the phrase "substantially free of any plasticizer" refers to any composition which comprises 1 wt. % or less of total plasticizer solids, based on the total weight of the composition, or, preferably, 0.8 wt. % or less.

As used herein, the phrase "weight average particle size" refers to the weight average particle size of a material as determined using capillary hydrodynamic fractionation (CHDF) with a Matec CHDF 2000 chromatography system (Matec Applied Sciences, Northborough, Mass.).

As used herein the phrase "weight average molecular weight" refers to the weight average molecular weight of a polymeric material as determined using a gel permeation chromatography (GPC) technique with an Agilent A1100 liquid chromatography system with system control (Agilent, Santa Clara, Calif.). Data acquisition and processing were done with Agilent GPC Data Analysis Software for Agilent Chemstation. Samples were prepared by dissolving the latex sample in tetrahydrofuran (THF) to a concentration of around 1 mg/mL, filtered through a 0.45 μm PTFE filter, the separated on the above-described system. Relative molecular weights of the samples was calculated using a linear calibration curve determined by EasiCal with PS-1 polystyrene standards of from MW 580 to 7,500,000 from Polymer Laboratories (Varian, Inc., Palo Alto, Calif.) converted to pMMA.

The present invention provides aqueous caulk or sealant compositions that may be free of any plasticizer and exhibits desirable low temperature flexibility in use. a less temperature sensitive tensile modulus. This will increase the elasticity and durability of the sealant as it is applied on the building exterior and is subjected to seasonal temperature swings. It will allow the sealant to withstand ±35% or more joint movement capability as measured by ASTM C-719 (2014). The hard stage of the multistage aqueous emulsion copolymers reduces the tackiness of the polymer surface, enabling one to formulate caulk and sealant compositions with less filler which translates to more flexibility. Such a tack reduction causes less modulus increase and elongation loss than in compositions containing more filler, like calcium carbonate. The soft stage, preferably having a calculated $T_g$ below −30° C., creates lower stress at −30 deg C.

The multistage aqueous emulsion copolymers of the present invention are made by a two stage gradual addition copolymerization process where a first monomer mixture with calculated $T_g$ of at least 40° C. is polymerized first to make a hard stage. At the end of the feed of the first monomer mixture, a second monomer mixture is introduced and is polymerized in the presence of the hard stage. The multistage aqueous emulsion copolymer of the present invention shows hard domains are uniformly distributed into the soft matrix and does not form a continuous network.

In the multistage aqueous emulsion copolymers of the present invention, the weight average particle size (by light scattering or by using a B1-90 particle size analyzer, Brookhaven Instruments, Holtsville, N.Y.) of the hard stage is larger than where the hard stage is polymerized after the soft stage. The weight average particle size of the hard stage in the multistage aqueous emulsion copolymers may range from 60 nm to 350 nm, or, preferably, from 70 to 300 nm, or, preferably, from 80 to 200 nm.

In general, the multistage aqueous emulsion copolymers of the present invention are formed by aqueous emulsion polymerization in the presence of an initiator, such as a thermal initiator like a peracid, e.g. persulfate, or a peroxide, or a redox pair, such as a peracid or peroxide and a reducing agent like a bisulfite or an organic sulfoxylate. Such emulsion polymerization methods are conventional in the art and are described below in more detail.

The hard stage is the polymerization product of a first monomer mixture of from 0.1 to 3 wt. % acrylic acid or its salts, from 70 to 99.9 wt. %, or, preferably, from 80 to 99.9 wt. % of nonionic monomers B) chosen from butyl methacrylate (BMA), methyl methacrylate (MMA), t-butyl acrylate (t-BA), styrene, α-methyl styrene, vinyl acetate, hexyl acrylate and isobornyl (meth)acrylate, and the remainder of one or more other nonionic monomers, all monomer amounts based on the total weight of monomers used to make the hard stage.

The soft stage of the multistage aqueous emulsion copolymers of the present invention comprises, in copolymerized form, a second monomer mixture of from 92.5 to 99.9 wt. %, based on the total weight of monomers used to make the soft stage, of one or more nonionic monomers, the nonionic monomers including from 70 to 99.9 wt. %, or, preferably, from 80 to 99.9 wt. %, or, more preferably, from 90 to 99.9 wt. % of nonionic monomers A), as defined below, and the remainder, in copolymerized form, of any of (i) MAA or its salts with one or more second acid monomer or its salts, (ii) a mixture of acid or salt and hydroxyl groups from, in copolymerized form, one or more acid monomer chosen from MAA and the second acid monomer, salts thereof, and hydroxyl group containing monomers.

To insure acceptable weatherability of the multistage aqueous emulsion copolymers of the present invention, the relative amount of MAA or its salt to the second acid monomer or its salt or to the hydroxyl group containing monomer used to make the soft stage should be limited. Suitable soft stages include backbone acid group containing copolymers copolymerized from second acid monomers chosen from monocarboxylic acids, dicarboxylic acids or their salts in the weight ratios stated above, phosphorus acids, sulfur acids or their salts, copolymers having a mixture of acid and hydroxyl groups copolymerized from hydroxyl group containing monomers and acid monomers or their salts in the weight ratios stated above. Combinations of any and all such copolymers are included.

The addition of a hydroxyl group to the soft stage of the multistage aqueous emulsion copolymers provides an additional route to adhesion to hydroxyl rich surfaces, such as glass, and generally improves binder weathering characteristics.

For example, the soft stage may be copolymerized from a mixture of acids or salts in the polymer backbone, such as, for example, mixtures of methacrylic acid (MAA) and second acid monomers having a pKa lower than MAA (<4.3) chosen from monocarboxylic acids, dicarboxylic acids, and sulfur acids and phosphorous acids, or any salts thereof.

In another example, the soft stage has backbone acid and hydroxyl groups and is copolymerized from one or more ethylenically unsaturated hydroxyl group containing monomer, such as a hydroxyalkyl (meth)acrylate, preferably, 2-hydroxyethyl methacrylate (HEMA), 3-hydroxypropyl (meth)acrylate, 2,3-dihydroxypropyl (meth)acrylate.

Other than MAA, suitable second acid monomers and acidic monomers may be chosen from and any acidic monomer with a pKa lower than the pKa of MAA, i.e. a pKa of 4.3 or lower, or its salts. Suitable mono- and di-carboxylic acid monomers may include, for example, acrylic acid (AA), itaconic acid (IA), maleic acid (MA), and fumaric acid (FA), and salts thereof. Suitable sulfur acid containing monomers may include, for example, styrene sulfonate and acrylamidopropane sulfonate and their salts. Suitable phosphorus containing acids may include, for example, any phosphorus containing acids possessing at least one POH group in which the hydrogen atom is ionizable, and their salts, such as phosphoalkyl (meth)acrylates like 2-phosphoethyl methacrylate (PEM), di-, tri-, or poly-phosphate ester group containing (meth)acrylates; alkylvinyl phosphonates and their salts; monomers containing groups formed from phosphinic acid, phosphonic acid, phosphoric acid, pyrophosphinic acid, pyrophosphoric acid, partial esters thereof, and salts thereof. Preferably, the second acid is chosen from acrylic acid, itaconic acid and/or PEM.

Suitable soft stages of the multistage aqueous emulsion copolymers of the present invention are copolymerized from nonionic monomers and total amounts of one or more acid monomer or its salt ranging up to 5.0 wt. %, based on the total weight of monomers used to make the soft stage, or 0.1 wt. % or higher, or 0.3 wt. % or higher, or 0.5 wt. % or higher, preferably, 3.0 wt. % or less, or, more preferably, 2.0 wt. % or less.

Suitable soft stages of the multistage aqueous emulsion copolymers having a mixture of backbone acid and hydroxyl groups may be copolymerized from nonionic monomers and total amounts of one or more hydroxyl group containing monomers ranging up to 7.5 wt. %, based on the total weight of monomers used to make the soft stage, or 0.5 wt. % or higher, preferably, 5.0 wt. % or less, or, more preferably, 2.0 wt. % or less.

Second acid monomers for use in making a soft stage having mixed backbone acids may be chosen from one or more ethylenically unsaturated mono- or di-carboxylic acids present in a weight ratio of MAA or salts to the second acid monomers, or salts, ranging from 5.5:1 to 1:5, preferably, 3:1 or less, or, preferably, 1:3 or more, or, more preferably, 1:1 or less.

Other second acid monomers for use in making the soft stage having mixed backbone acids may be chosen one or more sulfur acid and/or phosphorus acid monomer or its salt, such as PEM, in a weight ratio of the MAA or its salt to the second acid monomer or its salt ranging from 9:1 to 2.2:1, or 2.5:1 or more, preferably 3:1 or more, or, preferably, 6:1 or less. Such a soft stage may comprise both backbone acid and hydroxyl groups.

Suitable soft stages having a mixture of backbone acid and hydroxyl groups are copolymerized from one or more hydroxyl group containing monomer and one or more of MAA and a second acid monomer, or salt thereof, in a weight ratio of hydroxyl group containing monomer to total acid monomer (MAA and second acid) ranging from 5:1 to 1:5, preferably, 3:1 or less, or, preferably, 1:3 or more, or, more preferably, 1:1 or less.

Suitable nonionic monomers for use in making the multistage aqueous emulsion copolymers of the present invention include acrylic and vinyl nonionic monomers. Acrylic nonionic monomers may include, for example, one or more $C_{1-30}$ alkyl (meth)acrylate monomer, $C_{5-30}$ cycloalkyl (meth)acrylate, or $C_{5-30}$ (alkyl)aryl (meth)acrylate monomer, including, for example, methyl methacrylate, isodecyl methacrylate $C_1$ to $C_{30}$ alkyl (meth)acrylates. Vinyl nonionic monomers may include, for example, vinyl acetate or other vinyl esters; vinyl monomers, such as styrene or substituted styrenes, including α-methyl styrene, vinyl chloride, and vinylidene chloride.

Suitable nonionic monomers A) useful for the second monomer mixture to make the soft stage of the multistage aqueous emulsion copolymers of the present invention comprise monomers that give low $T_g$ polymers, including, but not limited to ethyl acrylate (EA), butyl acrylate (BA), 2-ethylhexyl acrylate (2-EHA), lauryl acrylate, lauryl methacrylate, cetyl (meth)acrylate, eicosyl (meth)acrylate, cetyleicosyl (meth)acrylate, behenyl (meth)acrylate, methyl acrylate, butyl methacrylate (BMA), dodecyl methacrylate and octadecyl methacrylate.

Preferably, the soft stage is the polymerization product of nonionic monomers A) chosen from EA, BA, and 2-EHA.

Polymerization techniques used to prepare multistage aqueous emulsion copolymers are well known in the art, such as, for example, U.S. Pat. Nos. 4,325,856, 4,654,397, and 4,814,373. In multi-stage polymerization processes, at least two stages differing in composition are formed in a sequential fashion.

In emulsion polymerization, a monomer mixture may be added neat or as an emulsion in water. Any monomer mixture may be added in one or more additions and may be added continuously over all or part the reaction period or not continuously over all or part of the reaction period. Any monomer mixture can be added linearly, such as in the case of gradual addition (grad add), or not, such as, for example, in semi-continuous polymerization or addition all at once as a "shot", or in any combination thereof. To make higher mw polymers, one or more monomer mixtures should be added as a "shot" to the reactor or initially charged in the reactor at the beginning of one or more reaction stage.

In emulsion polymerization, conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids, sulfosuccinate salts; fatty acids; ethylenically unsaturated surfactant monomers; and ethoxylated alcohols or phenols. The amount of surfactant used is usually 0.1% to 6% by weight, based on the weight of monomer.

Thermal or redox initiation processes may be used in multi-stage emulsion polymerization processes. Known free radical initiators such as, for example, peroxides, ammonium and/or alkali persulfates may be used at a level of from 0.01 to 3.0 wt. %, based on the total weight of monomers used. Redox systems using the same initiators may be used coupled with a suitable reductant such as, for example, (iso)ascorbic acid, alkali metal and ammonium salts of sulfur-containing acids, such as sodium sulfite, bisulfite, formadinesulfinic acid, hydroxymethanesulfonic acid, sodium sulfoxylate formaldehyde (SSF), 2-hydroxy-2-sulfinatoacetic acid, 2-hydroxy-2-sulfonatoacetic acid, amines such as ethanolamine, glycolic acid, glyoxylic acid hydrate, mercaptans, such as mercaptopropionic acid or methyl-3-mercaptopropionate, lactic acid, glyceric acid, malic acid, tartaric acid and salts of the preceding acids. Redox reaction catalyzing metal salts of iron, copper, nickel, or cobalt may be used.

Chain transfer agents, such as n-dodecyl mercaptan (nDDM), may be used to lower the molecular weight of a polymer of one or more of the polymer stages; and these may be added in one or more additions or continuously, linearly or not, over most or all of the entire reaction period or during limited portion(s) of the reaction period. Suitable chain transfer agents may include, for example, halogen compounds such as tetrabromomethane; allyl compounds; and, preferably, mercaptans, such as alkyl thioglycolates, alkyl mercaptoalkanoates, and $C_4$-$C_{22}$ linear or branched alkyl mercaptans, and, more preferably, methyl 3-mercaptopropionate, butyl 3-mercaptopropionate, n-hexyl mercaptan, n-dodecyl mercaptan, and mixtures thereof.

Preferably, one or more chain transfer agents is added in making the hard stage in the amount of from 0.5 to 5 wt. %, preferably, from 0.9 to 2.5 wt. %, based on the total solids weight of all monomers used to make hard stage.

In any emulsion polymerization, the reaction temperature should be maintained at a temperature lower than 100° C. throughout the course of the reaction, for example, at 30° C. or more, or 95° C., or 60° C. or more, or up to 90° C.

Hold time is the amount of time between polymerization stages. A longer hold time allows more complete reaction of the monomers in the hard stage while a shorter or zero hold time does the reverse. Preferably, a hold time ranges from 1 to 60 minutes, for example, from 10 to 30 minutes.

Following polymerization, initiators, optionally combined with reducing agents, may be used to minimize residual monomer content.

The aqueous caulk or sealant compositions may be prepared by techniques which are well known in the sealants art. For example, the multistage aqueous emulsion copolymer is added directly to a kettle, followed by additional ingredients and, lastly, by any filler, pigment, extender and/or thickener. Mixing may be done in a high shear mixer with a sweep arm designed to pull a high viscosity composition into the center of the mixer, or in a planetary mixer, with or without a high speed disperser blade. After all of the ingredients are added, the composition is allowed to mix under a vacuum of 750 mm Hg or lower to remove entrapped air from the final product.

The aqueous caulk and sealant compositions may have fillers, extenders and or pigments. To achieve higher or lower levels of performance, pigment to binder ratios can be adjusted, respectively, down or up Suitable fillers may include, for example, alkaline earth metal sulfates or carbonates, such as, for example, barites, calcium carbonate, calcite and magnesium carbonate; silicates, such as, for example, calcium silicates, magnesium silicates, and talc; metal oxides and hydroxides, such as, for example, titanium dioxide, alumina and iron oxides; diatomaceous earth; colloidal silica; fumed silica; carbon black; white carbon black; nutshell flour; natural and synthetic fibres (especially plaster fibres); and scrap or recycled plastics in the form of dust, flakes or flour; hollow or solid ceramic, glass or polymeric microspheres.

To enable improved adhesion, especially to glass, the caulk and sealant compositions may comprise one or more organosilane adhesion promoter in amounts ranging from 0.001 to 5 wt. %, based on the total weight of the composition, preferably, 0.01 wt. % or more, or, preferably, up to 1.0 wt. %, or, more preferably, up to 0.5 wt. %.

Suitable organosilanes may include, for example, any hydrolyzable or alkoxy functional organosilanes, such as, for example, epoxysilanes, trialkoxysilanes; aminoalkylsilanes or aminoalkoxysilanes, such as γ-aminopropyl triethoxysilane.

To improve dirt pickup resistance and stain resistance, avoid a tacky product when dried, and retain flexibility in use the aqueous caulk and sealant compositions consist essentially of compositions free of tackifiers.

To enable improved filler dispersion and uniformity in the composition, the aqueous caulk and sealant compositions may comprise one or more dispersant which can be an organic dispersant, e.g. a carboxylic acid (co)polymer, such as poly(methacrylic acid), or inorganic dispersant, such as alkali(ne) metal salts of tripolyphosphates, metaphosphates and their salts, and hexametaphosphates and their salts. Suitable amounts of dispersants may range from 0.01 to 5 wt. %, based on the total weight of the composition, preferably, 0.02 to 2 wt. %, or, more preferably, 0.1 to 1.0 wt. %.

Solvents may be added to improve tooling in use, increase open time (storage stability) and to better disperse additives, such as the silanes. Suitable solvents may include, for example, mineral spirits, turpentine, mineral oil, and (poly) alkylene glycols.

The compositions of the present invention may also include other additives conventionally employed in caulks and sealants, such as, for example, free-thaw stabilizers, drying oils, biocides, rheology modifiers or thickeners, such as cellulosics, kaolin, polyacrylic acids and polyurethane thickeners, antifoamants, colorants, waxes and anti-oxidants.

Surfactants and emulsifiers commonly used in emulsion polymerization may be present. These include anionic, nonionic, and cationic surfactants, such as, for example, nonionic surfactants, like alkylphenol ethoxylates (APEO) or APEO-free surfactants. Surfactants can be added to the multistage aqueous emulsion copolymers during synthesis as post additives.

The compositions of the present invention are suitable for uses including caulks, sealants and construction adhesives, such as by applying the caulk and sealant to a substrate from a cartridge and allowing it to dry. Caulks and sealants can be applied to various substrates including wood, glass, metal, masonry, vinyl, brick, concrete block, fiber cement, gypsum, stone, tile and asphalt. Uses may include caulking and sealing windows, doors, fixtures, paneling, molding, finished walls and ceilings, and any gap, seam or joint therein or between substrate pieces, such as in tilt-up construction and chinking applications

EXAMPLES

The following examples illustrate, but do not limit, the present invention. In the examples, the following chemical abbreviations are used: AA: Acrylic Acid; AN: Acrylonitrile; BA: Butyl Acrylate; EA: Ethyl Acrylate; EHA: 2-Ethylhexyl Acrylate; HEMA: 2-Hydroyethyl Methacrylate; IA: Itaconic Acid; MAA: Methacrylic Acid; MMA: Methyl Methacrylate; nDDM: n-Dodecyl Mercaptan; PEM: 2-Phosphoethyl Methacrylate; SSF: Sodium Sulfoxylate Formaldehyde; tBHP: tert-Butyl Hydroperoxide; TAHP: tert-Amyl Hydroperoxide; IAA: D-Isoascorbic Acid; FF6: Bruggolite™ FF6M, a mixture of 2-hydroxy-2-sulfonatoacetic acid and 2-hydroxy-2-sulfinatoacetic acid (L. Brüggemann KG, Heilbronn, Del.); Na$_4$EDTA: Ethylene Diamine Tetraacetic Acid Tetrasodium salt; FeSO4: Ferrous Sulfate; SDBS: sodium dodecylbenzene sulfonate.

Shown below in Table 1, the following materials were used to prepare multi-stage acrylic copolymers or their formulations:

TABLE 1

| Name | Composition and Source |
| --- | --- |
| AEROSOL ™ A-102 | Aqueous solution of disodium ethoxylated alcohol C$_{10}$-C$_{12}$ half ester of sulfosuccinic acid (25 wt. % Active Solids, Cytec Corporation, Stamford, CT) |
| Nonionic surfactant | [1]TRITON X-405 Octylphenol Ethoxylate |
| CellulosicThickener | [1]CELLOSIZE QP 100MH-Hydroxyethyl Cellulose |
| Biocide | [1]KATHON LX 1.5% 5-chloro-2-methyl-4-isothiazolin-3-one + 2-methyl-4-isothiazolin-3-one |

TABLE 1-continued

| Name | Composition and Source |
| --- | --- |
| Silane | [2]MOMENTIVE A-187 Gamma-Glycidoxypropyltrimethoxysilane |
| UV Stabilizer 1 | [3]TINUVIN 1130 Mixture of b-[3-(2-H-Benzotriazole-2-yl)-4-hydroxy-5-tert•butylphenyl]-propionic acid}-poly(ethylene glycol) 300-ester and Bis{b-[3-(2-H-Benzotriazole-2-yl)-4-hydroxy-5-tert•butylphenyl]-propionic acid}-poly(ethylene glycol) 300-ester |
| UV Stabilizer 2 | [3]TINUVIN 292 Mixture of Bis(1,2,2,6,6-pentamethyl-4-piperidyl) sebacate and Methyl 1,2,2,6,6-pentamethyl-4-piperidyl sebacate |
| Titania | [4]TI-PURE R-900 |
| Silica | [5]CAB-O-SIL M-5 Silicon Dioxide |
| Thickener | [1]ACRYSOL TT-615 Poly(EA/MAA/QM-1482 AI) |
| Biocide 2 | [1]SKANE M-8 fungicide 2-n-octyl-4-isothiazolin-3-one |

[1]Dow Chemical Co., Midland, MI;
[2]Momentive Performance Materials Inc., New Smyrna Beach, FL,
[3]BASF Ag, Florham Park, NJ,
[4]DuPont, Wilmington, DE,
[5]Cabot Corporation, Boyertown, PA.

Emulsions A and B were each made by two-stage polymerization process in which the hard stage copolymer was prepared prior to polymerization of the soft stage copolymer.

Synthesis of Emulsion A:

To a 5 L glass reactor equipped with a mechanical stirrer, thermocouple, condenser and a stainless steel diptube was charged with 465 g of deionized (DI) water at ambient temperature (20° C.) and warmed. With the reactor temperature at 90° C., an aqueous solution composed of 2.1 g ammonium persulfate (APS) and 18 g DI water was added to the reactor followed by a 5 g DI water rinse. 40.3 g of a BA/MMA/MAA latex seed having a particle size of 100 nm was added followed by an 18 g DI water rinse. With the reactor temperature at 83° C., a first monomer emulsion (ME1) as shown in Table 1-1 below, was transferred with a FMI (Fluid Meter Incorporated, Syosset, N.Y.) pump at 11.16 gm/min into the reactor. Simultaneously, an aqueous solution composed of 8.25 g of APS and 104 g DI water was added at 0.52 gm/min into the reactor using a syringe pump. The reactor temperature was maintained between 84-86° C. After 10 minutes, the feed rates of both ME1 and the aqueous APS solution were increased to 22.3 and 1.04 gm/min, respectively. After 28 min, ME1 had been transferred to the reactor and a 31 g DI water rinse was added. A sample was obtained and analysed. After ME1 had been feed, monomer emulsion #2 (ME2) was transferred at 35.3 gm/min to the reactor. The aqueous APS solution was continued to be transferred to the reactor at the 1.04 gm/min. After 793 g ME2 had been added to the reactor, 62.22 g of a BA/MMA/MAA latex seed having a particle size of 65 nm was added to the reactor followed by an 18 g DI water rinse. After 1707 g of ME2 had been added to the reactor, 0.96 g of nDDM was added to ME2. After 70 min, both ME2 the aqueous APS solution feeds were completed. The reactor was cooled to 75° C. Next, three solutions were added to the reactor sequentially: 1) 3.77 g of an aqueous solution of ammonium hydroxide (30% active), 2) an aqueous solution composed of 0.0095 g ferrous sulfate heptahydrate and 5 g DI water, and 3) 0.79 g of an aqueous solution of tert-butylhydroperoxide (tBHP, 70%). Each solution was added to the reactor over ~10 seconds and each addition was followed by a 5 g DI water rinse. An aqueous solution composed of 0.6 g FF6 and 13 g DI water was added to the reactor over 15 minutes at 0.91 gm/min. Next 3.99 g of tBHP and 4 g DI water was added to the reactor. An aqueous solution composed of 2.6 g of FF6 and 26 g DI water was added to the reactor over 30 min at 0.97 gm/min. The reactor was cooled to 50 C over 30 min.

TABLE 2

|  | Wt (gm) |
|---|---|
| 1st Monomer Emulsion (ME1) | |
| DI WATER | 84 |
| SODIUM DODECYLBENZENESULFONATE, BRANCHED | 5.17 |
| AEROSOL A-102 | 9.70 |
| BUTYL ACRYLATE (BA) | 77.6 |
| METHYL METHACRYLATE (MMA) | 304.10 |
| GLACIAL ACRYLIC ACID | 5.81 |
| n-DODECYL MERCAPTAN, (n-DDM) | 3.87 |
| 2nd Monomer Emulsion (ME2) | |
| DI WATER | 444 |
| SODIUM DODECYLBENZENESULFONATE, BRANCHED | 32.67 |
| AEROSOL A-102 | 32.79 |
| BUTYL ACRYLATE | 1668.2 |
| 2-ETHYLHEXYL ACRYLATE (EHA) | 485.9 |
| METHYL METHACRYLATE | 41.44 |
| HYDROXYETHYLMETHACRYLATE | 40.47 |
| GLACIAL METHACRYLIC ACID | 10.34 |
| GLACIAL ACRYLIC ACID | 31.01 |

At 50° C., 12.4 g of a biocide (Kathon™ LX (1.4%) ordek LX5000, Dow Chemical, Midland, Mich.) diluted in 13 g DI water was added to the latex over 15 minutes followed by 10 g DI water rinse. The resulting latex was isolated and analyzed: 63.57% Solids; pH 4.21, a viscosity of 139 cPs (LV #2/60 rpms), 3 ppm MMA, 56 ppm BA and 25 ppm EHA. Particle size analysis using capillary hydrodynamic fractionation (CHDF) technique indicated a particle size distribution based on area weight percent of 469 nm (94.5%) and 100 nm (5.5%) DSC analysis afforded a midpoint of 68.2° C. for stage 1 and −45.2° C. for stage 2. Molecular weight analysis of stage 1 was determined using GPC: Mw: 59,905, Mn: 13,946 and Mp: 39,265.

Synthesis of Emulsion B:

The process was the same as the procedure described for Emulsion A, except 1.94 gm of nDDM was used in Monomer Emulsion 1 (ME1) versus 3.87 gm. The resulting latex was analysed: 64.22% Solids; Viscosity of 160 cPs (LV #2/60 rpms), 127 ppm BA and 53 ppm EHA and 5 ppm MMA. DSC analysis for stage 1 was 70.4° C. and −43.9° C. for stage 2. Molecular weight analysis of stage 1 was determined using GPC: Mw: 62,260, Mn: 6410 and Mp: 6510. Particle size analysis using CHDF technique indicated a particle size distribution based on area weight percent of 492 nm (83.9%), 145 nm (4.8%) and 107 (9.2%).

Synthesis of Emulsion C:

The process was the same as the procedure described for Emulsion A, except 3.10 gm of nDDM was used in Monomer Emulsion 1 (ME1) versus 3.87 gm. The resulting latex was analysed: 64.30% Solids; Viscosity of 160 cPs (LV #2/60 rpms). DSC analysis for the hard stage was 70.0° C. and −44.3° C. for the soft stage. Molecular weight analysis of hard stage was determined using GPC: Mw: 54,160, Mn: 9610 and Mp: 3710. Particle size analysis using a CHDF technique indicated a particle size distribution based on area weight percent of 485 nm (100%).

Synthesis of Emulsion D:

The process was the same as the procedure described for Emulsion A, except 7.74 gm of nDDM was used in Monomer Emulsion 1 (ME1) versus 3.87 gm. The resulting latex was analysed: 64.31% Solids; Viscosity of 166 cPs (LV #2/60 rpms). DSC analysis for the soft stage was −45.8° C. Particle size analysis using a CHDF technique indicated a particle size distribution based on area weight percent of 470 nm (93.6%), and 106 (6.4%).

Synthesis of Emulsion E:

The process was the same as the procedure described for Emulsion A, except 3.87 gm of acrylic acid (AA) was used in Monomer Emulsion 1 (ME1) versus 5.81 gm. The resulting latex was isolated and analyzed: 64.02% Solids; pH 4.53, a viscosity of 149 cPs (LV #2/60 rpms). Particle size analysis using CHDF technique indicated a particle size distribution based on area weight percent of 497 nm (93.5%), and 120 (6.5%).

Synthesis of Emulsion F:

The process was the same as the procedure described for Emulsion A, except 1.94 gm of acrylic acid (AA) was used in Monomer Emulsion 1 (ME1) versus 5.81 gm. The resulting latex was analysed: 63.81% Solids; Viscosity of 149 cPs (LV #2/60 rpms), pH 4.57. Particle size analysis was conducted using CHDF and afforded 88 nm (4.0%), 123 nm (4.2%) and 493 nm (91.7%). Particle size analysis using CHDF technique indicated a particle size distribution based on area weight percent of 493 nm (91.7%), 123 nm (4.2%) and 88 nm (4.0%).

Synthesis of Emulsion G:

To a 5 L glass reactor equipped with a mechanical stirrer, thermocouple, condenser and a stainless steel diptube was charged with 465 g of deionized (DI) water at ambient temperature (20° C.) and warmed. With the reactor temperature at 90° C., an aqueous solution composed of 2.1 g ammonium persulfate (APS) and 18 g DI water was added to the reactor followed by a 5 g DI water rinse. 40.3 g of a BA/MMA/MAA latex seed having a particle size of 100 nm was added followed by an 18 g DI water rinse. With the reactor temperature at 83° C., a monomer emulsion #1 (ME1) as shown in Table 1-1 below, was transferred with a FMI (Fluid Meter Incorporated, Syosset, N.Y.) pump at 11.16 gm/min into the reactor. Simultaneously, an aqueous solution composed of 8.25 g of APS and 104 g DI water was added at 0.52 gm/min into the reactor using a syringe pump. The reactor temperature was maintained between 84-86° C. After 10 minutes, the feed rates of both ME1 and the aqueous APS solution were increased to 22.3 and 1.04 gm/min, respectively. After 28 min, ME1 had been transferred to the reactor and a 31 g DI water rinse was added. A sample was obtained and analysed. After ME1 had been feed, monomer emulsion #2 (ME2) was transferred at 35.3 gm/min to the reactor. The aqueous APS solution was continued to be transferred to the reactor at the 1.04 gm/min. After 793 g ME2 had been added to the reactor, 62.22 g of a BA/MMA/MAA latex seed having a particle size of 65 nm was added to the reactor followed by an 18 g DI water rinse. After 1707 g of ME2 had been added to the reactor, 0.96 g of nDDM was added to ME2. After 70 min, both ME2 the aqueous APS solution feeds were completed. The reactor was cooled to 75° C. Next three solutions were added to the reactor sequentially: 1) 3.77 g of an aqueous solution of ammonium hydroxide (30% active), 2) an aqueous solution composed of 0.0095 g ferrous sulfate heptahydrate and 5 g DI water, and 3) 0.79 g of an aqueous solution of tBHP, 70% w/w in water. Each solution was added to the reactor over ~10 seconds and each addition was followed by a 5 g DI water rinse. An aqueous solution composed of 0.6 g FF6 and 13 g DI water was added to the reactor over 15 minutes at 0.91 gm/min. Next 3.99 g of tBHP and 4 g DI water was added to the reactor. An aqueous solution composed of 2.6 g FF6 and 26 g DI water was added to the reactor over 30 min at 0.97 gm/min. The reactor was cooled to 50 C over 30 min.

At 50° C., 12.4 g of a biocide (Kathon™ LX (1.4%) ordek LX5000, Dow) diluted in 13 g DI water was added to the latex over 15 minutes followed by 10 g DI water rinse. The resulting latex was isolated and analysed 64.16% Solids; pH 4.50, a viscosity of 277 cPs (LV #2/60 rpms). Particle size analysis using CHDF technique indicated a particle size distribution based on area weight percent of 145 nm (13.9%), 456 nm (86.1%).

TABLE 3

| | Wt (gm) |
|---|---|
| 1st Monomer Emulsion (ME1) | |
| DI WATER | 444 |
| SODIUM DODECYLBENZENESULFONATE, BRANCHED | 32.67 |
| AEROSOL A-102 | 32.79 |
| BUTYL ACRYLATE | 1668.2 |
| 2-ETHYLHEXYL ACRYLATE (EHA) | 485.9 |
| METHYL METHACRYLATE | 41.44 |
| HYDROXYETHYLMETHACRYLATE | 40.47 |
| GLACIAL METHACRYLIC ACID | 10.34 |
| GLACIAL ACRYLIC ACID | 31.01 |
| 2nd Monomer Emulsion (ME2) | |
| DI WATER | 84 |
| SODIUM DODECYLBENZENESULFONATE, BRANCHED | 5.17 |
| AEROSOL A-102 | 9.70 |
| BUTYL ACRYLATE (BA) | 77.6 |
| METHYL METHACRYLATE (MMA) | 304.10 |
| GLACIAL ACRYLIC ACID | 1.94 |
| n-DODECYL MERCAPTAN, (n-DDM) | 3.87 |

Methods:

Tensile Modulus:

Secant Modulus at 100% elongation, the stress of a sealant formulation was measured in an H block. The samples were prepared by casting a 1.26 cm thick sealant film between two Aluminum plates to make the H-block. The plates are 1.28 cm (½") W×15.36 cm (3") L. Two 1.28 cm (half inch) think spacers were placed on either side; the resulting wet sealant film was 5.12 cm (2") L and (1.28 cm (½")×1.28 cm (½") lateral cross section. The sealant was cured for one week at 73° F. and 50% Relative humidity, followed by two weeks in a 50° C. oven. After cure, the spacers were removed and a special grip is used to attach the sample to the Tinius Olson tensile testing machine (Tinius Olsen Testing Machine Co., Inc., Horsham, Pa.). The sample was placed in such a way that the cross section perpendicular to the direction of movement of the cross head was 5.12 cm×1.28 cm (2"×½"). The sample was pulled in such a way that it was extended at the rate of 0.512 cm (0.2")/minute. The strain is defined based on the movement of the cross head normalized by the 0.512 cm (½") thickness gap. Stress vs strain graph was plotted. The value of the stress at a strain of 100% was used as a secant modulus. A temperature controlled chamber was used to run the test at a temperature other than normal room temperature. An acceptable modulus at −15° C. is 0.7 MPa or less.

Modulus was also measured by a Dogbone method taken from a formulated caulk and sealant composition, as indicated. The method of measurement wags based on ASTM D-412-06a (2013). The dogbone shape allows a broader grip area and narrower, straight middle area. Stress is less in the grip so that it does not interfere with breaking of the film. Stress and strain calculations are taken from the middle region between the grips. A sealant film of 0.32 cm (⅛") wet thickness was cast on a polytetraflourethylene coated plate and cured for one day at 73° F., 50% relative humidity, followed by 3 days in 50° C. oven, and 7 days in a 60° C. oven. The film was flipped before the 60° C. cure to allow better drying. After cure, the dogbone shape was cut using a die. The dogbone was put in the Tinius Olson tensile tester using suitable grips. The cross head movement causes the sample to elongate under tension. The rate of pull was set at 5.12 cm (2")/min. Stress vs strain data was recorded. A temperature controlled chamber was used to run the test at a temperature other than normal room temperature. The secant modulus is defined as the value of stress at a strain of 100%. An acceptable modulus at −30° C. is 2.7 MPa or less.

Tack:

Tack measurement is qualitative. An individual touches a given cured sealant film with a finger and rates the tack on the basis of apparent stickiness. Tack is recorded as low, medium, high and very high. Acceptable tack is low or medium. A reference sealant may be used for comparison.

Low Temperature Flex:

Measured according to ASTM C793-05 (2010), "Standard test Method for Effects of Laboratory Accelerated Weathering on Elastomeric Joint Sealants." A sealant film of 130 mm×40 mm×3 mm thick was cast on an Aluminum plate using a rectangular brass frame as guide. The Aluminum plate is 152 mm×80 mm×0.3 mm (thick). For each example, three samples were cast. The samples were cured for 21 days at conditions of 23° C. and 50% RH. One sample was left as control and two others were transferred to an artificial weathering device. Two of the samples exposed for a minimum of 250 hours at an irradiance level of 0.51 W/(m²·nm). At the end of this exposure, the samples were conditioned for 24 hours in a freezer box at −26° C. The conditioned samples were bent around a steel mandrel of 12.7 mm in diameter. Test is passed if there is no through crack anywhere in the sample, including the area where it is bent.

Adhesion:

Peel adhesion was measured according to ASTM C794-10 (2010), "Standard Test Method for Adhesion-in-Peel of Elastomeric Joint Sealants." Specimens were prepared by drawing down on each of 76×152 mm glass, aluminum and concrete mortar substrates. A wire mesh screen was embedded in the sealant film in the middle of the thickness. The sealant film thickness was 4 mm and width was 25 mm. The sample was cured for one week at 23±2° C. (RT), 50±5% relative humidity (RH), followed by two weeks at 50±2° C. and 1 week in water at RT (in case of wet adhesion). Adhesion was then measured by grabbing the screen and pulling the sealant film using a Tinius Olsen tensile tester (model H10K-S from Tinius Olsen Testing Machine Co., Inc., Horsham, Pa.) at 51 mm/min. The force required to peel the sealant from the substrate (in Newtons) was measured. An acceptable result was a force of 22.2 N or more and less than 25% adhesive bond loss.

Dry Adhesion:

Two peel adhesion measurements on each of the three substrates were taken after the initial three week cure.

Wet Adhesion:

Two peel adhesion measurements on each of the three substrates were taken after an additional 1 week of water soak.

TABLE 4

Polymer Secant Modulus Measured By Dogbone Method

| Temperature | Secant Modulus (MPa) @ 100% Elongation | |
|---|---|---|
| (° C.) | Emulsion A | Emulsion G* |
| −30 | 1.3 | 1.67 |
| 22.8 | 0.1 | 0.096 |

*Denotes Comparative Example

As shown in Table 4, above, when the multistage aqueous emulsion copolymers of the present invention are formed so that the hard stage is made first, low temperature flexibility and reduced modulus improves dramatically as compared to the very same copolymer made with the soft stage first.

TABLE 4.1

Polymer Secant Modulus Measured By Dogbone Method

| Temperature | Secant Modulus (MPa) @ 100% Elongation | | | |
|---|---|---|---|---|
| (° C.) | Emulsion B* | Emulsion C* | Emulsion A | Emulsion D |
| −30 | 2.4 | 1.6 | 1.3 | 1.25 |
| 22.8 | 0.19 | 0.12 | 0.1 | 0.06 |
| Mw of Polymer hard stage | 62,260 | 54,160 | ~60k | — |

*Denotes Comparative Example

As shown in Table 4.1, above, when the multistage aqueous emulsion copolymers of the present invention are formed so that the hard stage has a molecular weight (Mw) of less than 70,000 and the amount of chain transfer agent was 0.9 wt. % or more, the resulting composition has a much improved low temperature flexibility.

Formulation Testing

Three formulations of the inventive polymer are presented here. These are sealant formulations with high viscosity, enough to hold it in a gap without slumping down. Formulation ABL814-25B is translucent, while the other two are white due to TiO$_2$ pigment. The formulation composition is in Table 5. The properties of these formulations, most relevant to sealant application are summarized in Table 6.

TABLE 5

Formulations of Inventive Polymer

| | Formulation Example | | |
|---|---|---|---|
| Material | A wt % | B wt % | C wt % |
| Emulsion A | 82.6% | 82.8% | 82.4% |
| Water | 5.1% | 5.1% | 5.1% |
| Sodium lauryl sulfate | 0.1% | 0.1% | |
| Nonionic surfactant | | | 0.9% |
| Propylene Glycol | 0.8% | 0.8% | |
| Ethylene Glycol | 0.8% | 0.8% | 1.7% |
| Cellulosic Thickener | | | 0.6% |
| Biocide | 0.1% | 0.1% | 0.1% |
| Biocide 2 | 0.1% | 0.1% | 0.1% |
| Mineral Oil additive | 5.7% | 5.7% | 5.7% |
| Silane | 0.5% | 0.2% | 0.3% |
| UV Stabilizer 1 | 0.1% | 0.1% | 0.1% |
| UV Stabilizer 2 | 0.1% | 0.1% | 0.1% |
| Titania | | 1.2% | 1.2% |
| Silica | 2.9% | 1.4% | 1.4% |
| Ammonia (28% w/w in water) | 0.5% | 0.6% | 0.5% |
| Dispersant | 0.7% | 1.0% | |
| Pigment to Binder Ratio | 0.06 | 0.05 | 0.05 |

TABLE 6

Formulation Property Summary

| | Example | | |
|---|---|---|---|
| Properties | A | B | C |
| % VS | 61.1 | 60.6 | |
| DogboneTensile (Room Temp) (1 d CTR, 3 d 50° C., 7 d 60° C. w/flip) | | | |
| Stress @ 25% Elongation (MPa) | 0.12 | 0.05 | 0.041 |
| Stress @ 50% Elongation (MPa) | 0.23 | 0.096 | 0.082 |
| Stress @ 100% Elongation (MPa) | 0.46 | 0.17 | 0.16 |
| Maximum Stress (MPa) | 0.91 | 0.53 | 0.62 |
| Elongation to Break (%) | 325 | 513 | 526 |
| DogboneTensile (−30° C.) | | | |
| Stress @ 25% Elongation (MPa) | 0.98 | | |
| Stress @ 50% Elongation (MPa) | 1.59 | | |
| Stress @ 100% Elongation (MPa) | 2.52 | | |
| Maximum Stress (MPa) | 7.63 | | |
| Elongation to Break (%) | 499 | | |
| Low Temperature Flex | | | |
| −15° F. | Pass | Pass | Pass |
| pH | 8.0 | 7.8 | 8.0 |
| Brookfield viscosity (×10$^3$, cPs) | 409-421 | 215-224 | 244-255 |

The formulations A, B and C in Table 6, above, all show good adhesion to Aluminum, Glass and Mortar substrates (by ASTM C-794-10). They all have excellent elasticity and low tack. Formulation Example A maintains elasticity down to a temperature of −30° C., as is evident from the relatively low stress values (<2.7 MPa at 100% strain) and high elongation (~500%) for Formulation A at −30° C.

We claim:

1. An aqueous caulk or sealant composition comprising one or more multistage aqueous emulsion copolymers having a hard stage and a soft stage,
the soft stage including, in copolymerized form, one or more nonionic monomers and any of (i) or (ii), (i) methacrylic acid (MAA) or a salt thereof and a second acid monomer having a lower pKa than methacrylic acid or a salt thereof, or (ii) a copolymer having a mixture of acid or salt groups and hydroxyl groups copolymerized, the acid groups being chosen from MAA and the second acid monomer, or a salt thereof; and
the hard stage having a weight average molecular weight (Mw) by gel permeation chromatography (GPC) against polystyrene standards of from 20,000 to 70,000, and including, in copolymerized form, one or more nonionic monomers, from 0.9 to 2.5 wt. % of one or more chain transfer agents, and from 0.1 to 3 wt. % of acrylic acid or a salt thereof, all weights based on the total weight of monomers used to make the hard stage, wherein, the hard stage comprises from 10 to 30 wt. %, of the multistage copolymer, based on the total weight of monomers used to make the multistage copolymer, and, further wherein, the multistage copolymer has a solids content of from 50 to 70 wt. %;

one or more fillers, extenders, pigments, and/or thickeners, including rheology modifiers, wherein the resulting caulk and sealant compositions have a Brookfield viscosity (room temperature, 5 rpm, using the indicated spindle) of from 3,000 to 1,000,000 cPs.

2. The aqueous caulk and sealant composition as claimed in claim 1, wherein the hard stage in the one or more multistage aqueous emulsion copolymers comprises, in copolymerized form, a first monomer mixture of from 0.1 to 3 wt. % acrylic acid or its salts, from 70 to 99.9 wt. % of nonionic monomers B) chosen from butyl methacrylate (BMA), methyl methacrylate (MMA), styrene, t-butyl acrylate (t-BA), α-methyl styrene, vinyl acetate, hexyl acrylate and isobornyl (meth)acrylate, and the remainder of one or more other nonionic monomers, all monomer amounts based on the total weight of monomers used to make the hard stage; and, further wherein, the soft stage comprises, in copolymerized form, a second monomer mixture of from 92.5 to 99.9 wt. % of one or more nonionic monomers so that from 70 to 99.9 wt. %, of all monomers in the soft stage, in copolymerized form, are nonionic monomers A) chosen from ethyl acrylate (EA), butyl acrylate (BA), 2-ethylhexyl acrylate (2-EHA), lauryl acrylate, lauryl methacrylate, cetyl (meth)acrylate, eicosyl (meth)acrylate, cetyleicosyl (meth)acrylate, behenyl (meth)acrylate, methyl acrylate, butyl methacrylate (BMA), dodecyl methacrylate and octadecyl methacrylate, all monomer amounts based on the total weight of monomers used to make the soft stage, and the remainder of the nonionic monomers in the soft stage, in copolymerized form, are other nonionic monomers.

3. The aqueous caulk and sealant composition as claimed in claim 1, wherein the one or more multistage aqueous emulsion copolymers have a solids content of from 60 to 70 wt. %.

4. The aqueous caulk and sealant composition as claimed in claim 1, wherein the hard stage of the at least one of the one or more multistage aqueous emulsion copolymers is free of carboxyl groups, salts thereof or hydroxyl groups other than carboxyl or salt groups from acrylic acid, in copolymerized form.

5. The aqueous caulk and sealant composition as claimed in claim 1, wherein the soft stage of the one or more multistage aqueous emulsion copolymers comprises, in copolymerized form, any of (i) methacrylic acid (MAA) and a second acid monomer having a lower pKa than methacrylic acid and chosen from a monocarboxylic acid, dicarboxylic acid, phosphorus acid, sulfur acid, any salt thereof, and mixtures thereof, the MAA and the second acid monomer, in copolymerized form, present, in total, in the amount of from 0.1 to 5.0 wt. %, based on the total weight of monomers used to make the soft stage; or (ii) a mixture of acid or salt and hydroxyl groups copolymerized, from 0.5 to 7.5 wt. %, based on the total weight of monomers used to make the soft stage, of one or more hydroxyl group containing monomer, and, from 1.0 to 5.0 wt. %, based on the total weight of monomers used to make the soft stage, of one or more acid monomer chosen from MAA or a salt thereof and the second acid monomer or a salt thereof.

6. The aqueous caulk and sealant composition as claimed in claim 1, having a pigment to binder ratio of from 0.0:1 to 1:1.

7. The aqueous caulk and sealant composition as claimed in claim 1, comprising from 0.1 to 5 wt. % as solids, based on the total weight of the composition, of one or more thickeners.

8. The aqueous caulk and sealant composition as claimed in claim 1, having a solids content ranging from 55 to 90 wt. %.

9. The aqueous caulk and sealant compositions as claimed in claim 1, which is substantially free of plasticizer.

10. The aqueous caulk and sealant composition as claimed in claim 1, wherein the hard stage of the one or more multistage aqueous emulsion copolymers has a measured $T_g$ of from 20° C. to 120° C., and the soft stage has a measured $T_g$ of from −20° C. to −60° C.

* * * * *